Oct. 25, 1932.   M. C. HUFFMAN   1,884,704
IMPACT TOOL
Filed Dec. 15, 1930
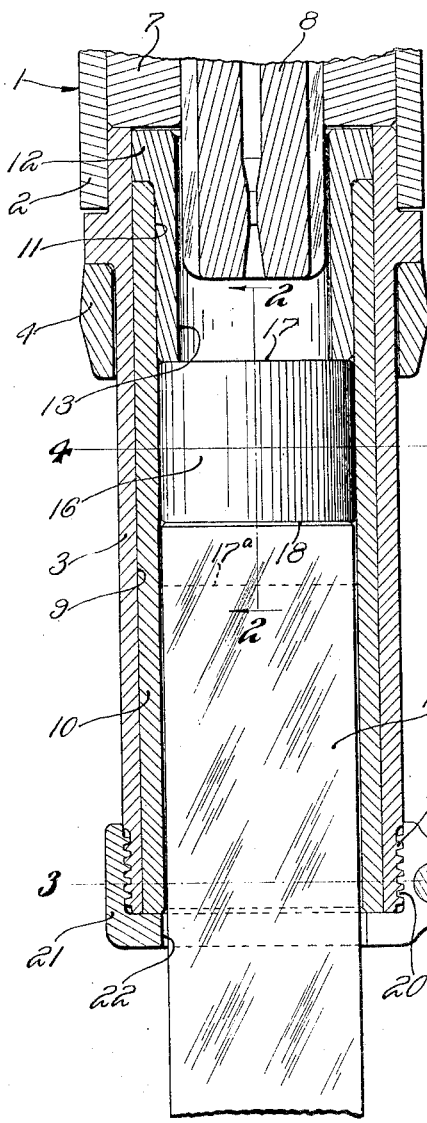
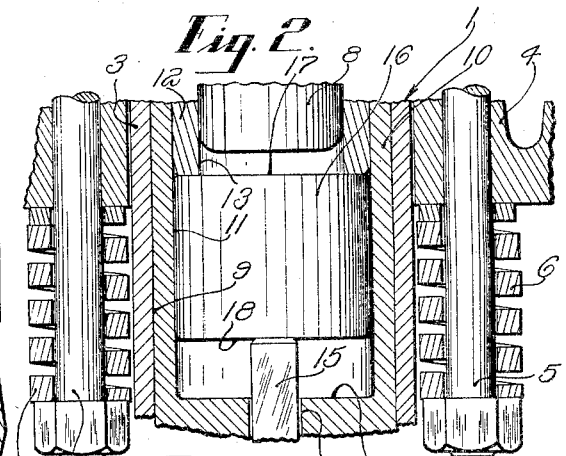
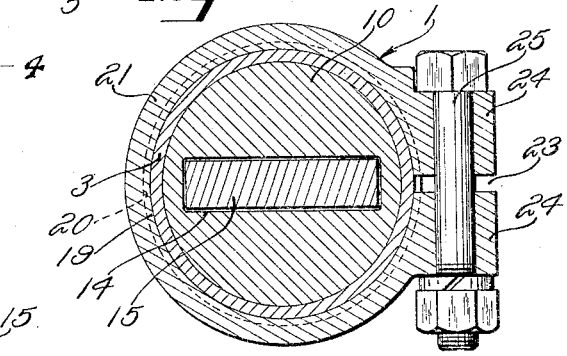
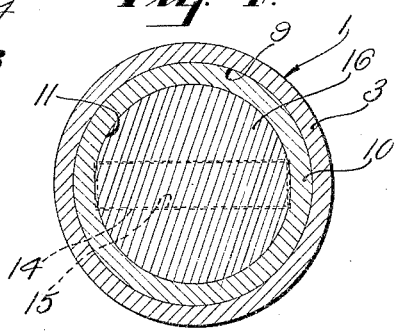
INVENTOR:
MERVIN C. HUFFMAN.
BY
ATT'Y.

Patented Oct. 25, 1932

1,884,704

UNITED STATES PATENT OFFICE

MERVIN C. HUFFMAN, OF CLAREMONT, NEW HAMPSHIRE, ASSIGNOR TO SULLIVAN MACHINERY COMPANY, A CORPORATION OF MASSACHUSETTS

IMPACT TOOL

Application filed December 15, 1930. Serial No. 502,441.

This invention relates to impact tools, and more particularly to impact tools of the fluid actuated hammer type.

An object of the invention is to provide an improved impact tool. A further object is to provide an improved impact tool of the fluid actuated hammer type. Still a further object is to provide, in an impact type tool, improved means for transmitting the blows of the impact element of such tools to the working implement thereof. Another object is to provide an improved chuck means carried by the forward portion of the tool, and still a further object is to provide an improved chuck sleeve having the impact transmitting means and the working implement carried thereby. Other objects and advantages of the invention will, however, hereinafter more fully appear.

In the accompanying drawing there is shown for purposes of illustration one form which the invention may assume in practice.

In the drawing—

Fig. 1 is a longitudinally extending section of the forward end of an impact tool having incorporated therein the illustrative embodiment of the invention;

Fig. 2 is a longitudinally extending section taken substantially on line 2—2 of Fig. 1;

Fig. 3 is a transverse section through the forward end of the tool showing improved means for maintaining the chuck sleeve in the chuck housing, the section being taken on line 3—3 of Fig. 1; and, Fig. 4 is a transverse section through the impact transmitting means, and the section is taken substantially on line 4—4 of Fig. 1.

In the illustrative embodiment of the invention there is shown the forward end of an impact tool, generally designated 1, herein a broaching tool. The tool 1 comprises a fluid operated percussive type motor (not shown except for the forward end of the cylinder 2 and a portion of the striking bar), and attached to the forward portion of this cylinder is a chuck housing 3. Surrounding the chuck housing is a collar 4, and the cylinder 1, chuck housing 3, and collar 4 are maintained in assembled relation by side bolts 5 and springs 6. Within the bore of the cylinder 2 is a bushing 7, which guides a striking bar 8 which extends forwardly from the piston (not shown) of the percussive motor. The chuck housing 3 has a bore 9 and within this bore is a chuck sleeve 10 extending longitudinally through the chuck housing 3. Interposed between the chuck sleeve 10 and the bushing 7 and extending forwardly into a bore 11 in the chuck sleeve 10 is a sleeve 12 having a bore 13 which receives and also guides the forward portion of the striking bar 8. The forward portion of the chuck sleeve 10 has a substantially rectangular shaped opening 14, which receives and positions a broaching steel 15, having its body portion of a flat rectangular shape similar to the opening 14 in the chuck sleeve.

Interposed between the forward part of the sleeve 12 and the broaching steel 15 is an elongated impact transmitting element or striking block 16 which is reciprocably mounted within the bore 11 of the chuck sleeve 10. It will herein be noted that this impact transmitting element or striking block is of a larger diameter than the striking bar 8 and has flat surfaces 17, 18, engageable respectively by the forward end of the striking bar 8 and with the rearward portion of the steel 15, and this striking bar is limited in its rearward travel by the forward portion of the sleeve 12, and limited in its forward travel by a surface 17a formed in the sleeve 10 at the forward end of the bore 11 therein. The forward portion of the chuck housing 3 is externally threaded as at 19, to cooperate with internal threads 20 on a detachable collar or clamping element 21. This collar member serves to maintain the sleeve 10 axially within the bore 9 of the chuck housing, or, upon removal of the collar, to permit the chuck sleeve to be axially removed through the forward end of the chuck housing. This collar 21 has an opening 22 through which the working implement of the impact tool extends. An enlarged portion on the collar 21 is preferably split as at 23 forming bosses 24 through which a bolt 25 extends for clamping the member 21 to the chuck housing.

As a result of the invention, it will be noted that an improved broaching tool has been provided having improved means for transmitting the impact blows of the impact element of the motor piston to the relatively flat rectangular shaped broaching steel, and it will also be noted that the impact transmitting element has a relatively large surface to receive the impact blows of the striking bar, rather than having the striking bar contacting directly with the relatively narrow broaching steel 15, thus eliminating cracking or chipping of the forward end of the striking bar and spreading, through localized hammering, of the end of the broaching steel. It will also be evident that an improved chuck sleeve has been provided having mounted therein both the impact transmitting element that transmits the impact blows of the impact tool, and the broaching steel. And further, an improved clamping means has been provided whereby the chuck sleeve, and associated parts may be easily and quickly withdrawn from the housing for inspection or inserted on assembling. It will also be noted that chuck sleeves having openings of various sizes for different size broaching steels may be selectively employed.

While there is in this application specifically described one form which this invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an impact tool, the combination with a hammer motor having an impact element, a working implement actuated thereby and a chuck housing, of a chuck sleeve mounted in said chuck housing and having a longitudinal opening for receiving the shank of the working implement and a bore opening through the rear end of said sleeve and into which the shank of the working implement projects, a cylindrical striking block reciprocably mounted in said sleeve bore for transmitting the impact blows of the impact element to the working implement, said striking block being removable from said sleeve bore through the rear end of said sleeve, said sleeve having a shoulder forming an abutment limiting forward movement of the striking block and a removable bushing projecting within the rear end of said sleeve and fitting said bore and having an opening through which the impact element projects, said bushing forming an abutment for limiting rearward movement of said striking block.

2. In an impact tool, the combination with a hammer motor having an impact element, a working implement actuated thereby and a chuck housing, of a chuck sleeve mounted in said chuck housing and having a longitudinal opening for receiving the shank of the working implement and a bore opening through the rear end thereof, a striking block reciprocably mounted in said sleeve bore for transmitting the blows of said impact element to the working implement, said chuck housing having an opening at its front end and said sleeve and striking block being removable through the front end of the chuck housing and said striking block being removable from the sleeve bore through the rear end of said sleeve, and means secured to said chuck housing for retaining said chuck sleeve therein.

3. In an impact tool, the combination with a hammer motor having an impact element, a flat rectangular-shaped broaching steel actuated thereby and a chuck housing, of a chuck sleeve mounted in said chuck housing and having a rectangular slot for receiving the shank of the broaching steel and a bore into which the steel shank projects, a cylindrical striking block reciprocably mounted in said sleeve bore for transmitting the impact blows of the impact element to the broaching steel, said chuck housing having an open front end and said sleeve and striking block being removable through the front end of said chuck housing, and means secured to said chuck housing for retaining the chuck sleeve therein.

4. In an impact tool, the combination with a hammer motor having an impact element, a flat rectangular-shaped broaching steel actuated thereby and a chuck housing, of a chuck sleeve mounted in said chuck housing and having a rectangular slot for receiving the shank of the broaching steel and a bore into which the steel shank projects, and a cylindrical striking block reciprocably mounted in said sleeve bore for transmitting the impact blows of the impact element to the steel, said chuck sleeve bore presenting at its front end at the sides of said slot abutment surfaces for limiting the forward movement of said striking block.

5. In an impact tool, the combination with a hammer motor having an impact element, a flat rectangular-shaped broaching steel actuated thereby and a chuck housing, of a chuck sleeve mounted in said chuck housing and having a rectangular slot for receiving the shank of the broaching steel and a bore into which the steel shank projects, a cylindrical striking block reciprocably mounted in said sleeve bore for transmitting the impact blows of the impact element to the steel, said chuck sleeve bore presenting at its forward end at the sides of said slot abutment surfaces for limiting the forward movement of said striking block, and a bushing projecting within the rear end of said bore and having an opening through which the impact element projects, said bushing forming an abutment for limiting rearward movement of the striking block.

In testimony whereof I affix my signature.

MERVIN C. HUFFMAN.